US007996733B2

(12) United States Patent
Arbeitman et al.

(10) Patent No.: US 7,996,733 B2
(45) Date of Patent: *Aug. 9, 2011

(54) IDENTIFY INDICATORS IN A DATA PROCESSING SYSTEM

(75) Inventors: Robert M Arbeitman, Austin, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 892 days.

This patent is subject to a terminal disclaimer.

(21) Appl. No.: 11/965,735

(22) Filed: Dec. 28, 2007

(65) Prior Publication Data

US 2008/0256540 A1 Oct. 16, 2008

Related U.S. Application Data

(63) Continuation of application No. 10/626,186, filed on Jul. 24, 2003, now Pat. No. 7,398,432.

(51) Int. Cl.
*G06F 11/00* (2006.01)
(52) U.S. Cl. .......................................... 714/57; 714/46
(58) Field of Classification Search .................... 714/46, 714/57
See application file for complete search history.

(56) References Cited

U.S. PATENT DOCUMENTS

| 6,697,963 | B1 | 2/2004 | Nouri et al. |
| 7,096,387 | B2 | 8/2006 | Durrant et al. |
| 7,398,432 | B2 | 7/2008 | Arbeitman et al. |
| 2004/0078711 | A1 | 4/2004 | King et al. |
| 2004/0230866 | A1 | 11/2004 | Yates et al. |

OTHER PUBLICATIONS

US Patent No. 7398432, filed Jul. 24, 2003, Arbeitman et al, Office Action, mailed Jun. 14, 2007, 8 pages.
US Patent No. 7398432, filed Jul. 24, 2003, Arbeitman et al, Notice of Allowance, mailed Oct. 4, 2007, 4 pages.

*Primary Examiner* — Robert Beausoliel
*Assistant Examiner* — Charles Ehne
(74) *Attorney, Agent, or Firm* — Matthew W. Baca; Amy J. Pattillo

(57) ABSTRACT

A data processing system employing identify indicators associated with various components of the system. The indicator may be activated whenever a corresponding component requires maintenance, field testing, installation, replacement, and the like. The user may specify global and local conditions under which an activated identify indicator is reset. After the indicator is activated, the system monitors for the satisfaction of one of the conditions. When one of the conditions is satisfied, the system deactivates the indicator automatically. The global conditions apply across logical partitions in a logically partitioned system thereby reducing the occurrence of stale identify indicators on all partitions.

12 Claims, 4 Drawing Sheets

IDENTIFY INDICATORS IN A DATA PROCESSING SYSTEM

CROSS-REFERENCE TO RELATED APPLICATIONS

This application is a continuation of commonly assigned U.S. patent application Ser. No. 10/626,186, filed Jul. 24, 2003 now U.S. Pat. No. 7,398,432, which is hereby incorporated herein by reference.

BACKGROUND

1. Field of the Present Invention

The present invention generally relates to the field of data processing systems and more particularly to a data processing system employing indicators to identify components of the system.

2. History of Related Art

Locating particular parts, referred to herein as field replaceable units (FRUs), in a large data processing system with multiple units in multiple racks within a large computer room can be difficult. Identify LEDs have been implemented on systems such as the IBM pSeries of systems to facilitate the identification of specific FRUs. When a FRU requires maintenance or replacement, an identify LED in proximity to the particular FRU is set to a blinking state to facilitate locating the FRU. While these identify LEDs are useful in locating a FRU, their usefulness is undermined if a blinking LED is not turned off after the FRU for which the LED is blinking has been serviced. This problem is of particular concern in a logically partitioned system because a system manager may not have access to identify LEDs that are part of another partition and is, therefore, at the mercy of the manager(s) of the other partitions.

Logical partitioning refers to the ability to make a single multiprocessor system, such as an AS/400e system from IBM Corporation, behave as if it were two or more independent systems. A system implementing logical partitions (LPARs) is referred to herein as an LPAR system. Logical partitions generally fall into two categories, namely, primary (or service) partitions and secondary partitions. Each logically partitioned system typically has a primary partition and one or more secondary partitions. Each logical partition represents a division of resources within the system. Each partition is referred to as "logical" because the division of resources is virtual, not physical. The primary resources in a typical system include its processors, main storage (system storage), I/O buses, and I/O adapters (IOA's). Each logical partition is configured to operate as an independent system, but each partition may share physical system attributes such as the system serial number, system model, and processor feature code. Other system attributes may vary among partitions. For example, each partition in a conventionally implemented LPAR may have dedicated hardware such as processors, main storage, and I/O devices.

Logically partitioned systems are gaining in popularity as a means of extending an enterprise's computing capabilities without expending resources on additional hardware. Dedicating a portion of a system's resources (disk storage units, processors, memory, and I/O devices) to a partition achieves logical isolation of software. Logical partitions also have some hardware fault tolerance if configured properly. Interactive and batch workloads that may not run well together on a single machine can be isolated and run more efficiently in separate partitions. Similarly, production and test environments can be implemented on a single physical system. Thus, a customer can consolidate several systems into one system with logical partitions thereby eliminating the need for, and expense of, additional equipment.

In large systems with multiple LPAR's, the number of FRUs may be very large. In this type of environment, identify indicators can be extremely valuable and even necessary. Consequently, the ability to keep the identify LEDs in their proper states is an important feature for systems employing such LEDs.

SUMMARY OF THE INVENTION

The objective identified above is addressed by a data processing system employing identify indicators, associated with various components of the system, that can be reset automatically in response to various user-tunable events or conditions. An identify indicator is activated to provide a visual indicator of the corresponding component's physical location. The indicator may be activated whenever the component requires maintenance, field testing, installation, replacement, and the like. After the indicator is activated, the system monitors for the completion of the task being performed on the component. When completion of the task is detected, the system deactivates the indicator automatically. Some of the events or conditions that are monitored represent global events, which are monitored across any logical partition boundaries of the system. In one embodiment, global events include the expiration of a default timeout period and the completion of a hot swap. In such cases, the identify indicators may be controlled by a hypervisor that operates across logical partitions in a logically partitioned system. In this manner, a system manager of one logical partition is prevented from determining the correct identify indicator when multiple, stale identify indicators on another partition are active. Other user-tunable events capable of initiating an automatic reset include the completion of a utility or application routine such as the completion of a wrap plug test. In these cases, the event is generally controlled by the operating system with the help of utilities that permit the operating system to make calls into the hypervisor.

BRIEF DESCRIPTION OF THE DRAWINGS

Other objects and advantages of the invention will become apparent upon reading the following detailed description and upon reference to the accompanying drawings in which.

Figure 1:
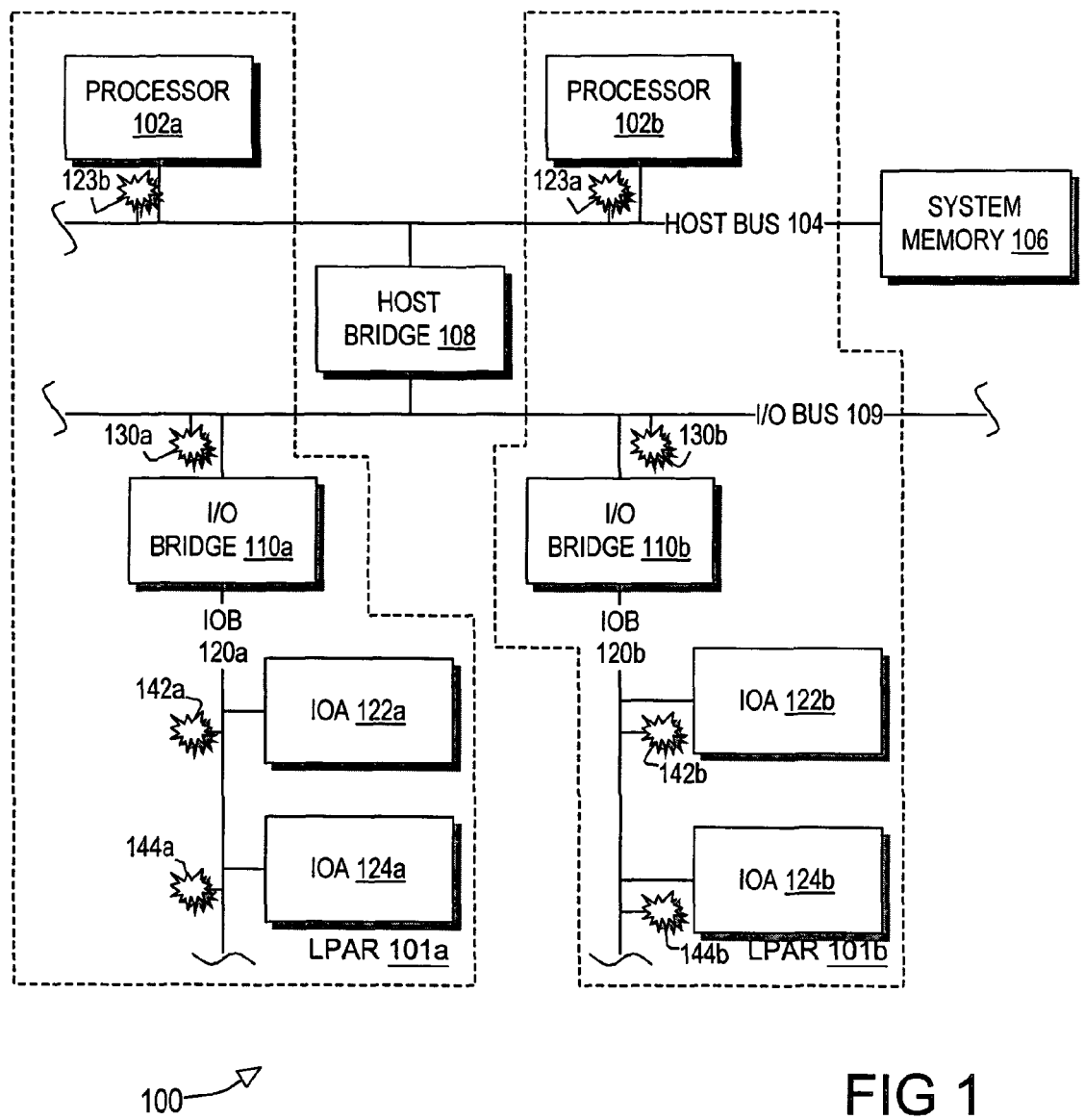
FIG. 1 is a block diagram of a logically partitioned data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a system and method for controlling the setting and resetting of identify indicators in a data processing system. The data processing system includes multiple system resources including processors, memory, I/O busses, and I/O adapters. Each of these resources may be associated with an identify indicator that enables a system administrator, field technician, or the like to establish the identity or physical location of the resource. The identify indicator may be set in response to either an explicit or implicit user request. An explicit request occurs when an administrator or other user, unsure of the location of an adapter or other resource, issues a command to set an identify indicator in close proximity to the resource to facilitate completion of a task such as the connecting of a cable to an adapter. An implicit request occurs, for example, when an administrator invokes a guided maintenance task for hot swapping an adapter. In this case, the maintenance task turns the identify indicator associated with the adapter on for the administrator without requiring an explicit request.

The system incorporates functionality that permits an administrator to tune conditions under which an identify indicator is automatically turned off. In a partitioned system configuration, the tunable conditions include globally tunable conditions that are applicable across logical partition boundaries within the system so that, once an identify indicator is set, the system monitors or polls the corresponding resource for satisfaction of one or more of these globally tunable conditions. If a globally tuned condition is satisfied for a particular identify indicator, the indicator is turned off regardless of the partition to which the resource is allocated. As an example of a globally tunable condition, the system can be configured to monitor the progress of a hot swap procedure and reset or deactivate the appropriate identify indicator when the corresponding adapter (also referred to as a field replaceable unit or FRU) has been installed. In this manner, active identify indicators (i.e., those that are flashing or otherwise lit), are more likely to correspond to an active system issue and less likely to be a "stale" indicator corresponding to a FRU that has already been service, tested, or replaced. The invention is especially useful in partitioned systems where systems managers may lack control over identify indicators allocated to other partitions. In addition to the globally tuned conditions, the system may include "locally" tuned conditions that are monitored by the operating system in conjunction with facilities enabling the operating system some control over the identify indicator hardware. Being controlled by the operating system, locally tuned conditions do not extend across partition boundaries but do, nevertheless, offer a reliable mechanism for resetting identify indicators following specified local events. The combination of globally and locally tuned conditions for resetting identify indicators beneficially reduces the occurrences of stale identify indicators.

Portions of the present invention may be implemented as a set of computer executable instructions (software) stored on a computer readable medium. The medium may include a volatile medium such as the system memory or cache memory of a data processing system during times when the instructions are being executed by the system. At other times, the instructions may be stored on a non-volatile medium such as a floppy diskette, hard disk, CD ROM, DVD, flash memory card, and the like.

The invention is described herein in the context of a partitioned data processing system. The partitioned system is a particularly suitable configuration in which to implement the present invention because a system administrator may lack authority or access to certain identify indicators associated with system resources allocated to other partitions. In this environment, an administrator would be wholly dependent, in the absence of the present invention, on the users/administrators of the other partitions to ensure that their identify indicators are properly set and reset. Implementation of the invention, however, does not require a partitioned system and may be effectively implemented on non-partitioned systems.

Turning to the drawings, FIG. 1 is a block diagram of selected elements of a logically partitioned data processing system 100. In the depicted embodiment, system 100 includes multiple general purpose microprocessors including a first processor 102a and a second processor 102b (generically or collectively referred to as processor(s) 102). Processors 102 are connected to a system memory 106 (DRAM) via a host bus 104.

A host bridge 108 provides an interface between host bus 104 and an I/O bus 109. I/O bus 109 is representative of any standardized peripheral bus including as an example, a Peripheral Components Interface (PCI) bus well known in the field of microprocessor-based data processing system design. The depicted embodiment of system 100 uses I/O bus 109 as a "primary" I/O bus that is connected to first and second secondary I/O busses 120a and 120b through a pair of I/O bridges 110a and 110b. Attached to each I/O bus 120, are peripheral devices or I/O adapters (IOA's) identified by reference numerals 122a, 124a, 122b, and 124b. These peripheral devices may represent any of a variety of peripheral devices including as examples, graphics adapters, SCSI disk controllers, and network adapters.

System 100 is partitioned into a first or primary logical partition (LPAR) 101a and a secondary LPAR 101b. In the partitioning depicted in FIG. 1, system resources such as processors 102, I/O busses 120, and IOA's 122 are dedicated to either first LPAR 101a or second LPAR 101b. Other partitioning arrangements (not depicted) may share or divide resources such as processors 102 and system memory 106.

Data processing system 100 as depicted in FIG. 1 includes a set of identify indicators. In this embodiment, each identify indicator is associated with a corresponding resource or FRU of system 100. These identify indicators are likely implemented as light emitting diodes (LEDs) positioned in close physical proximity to the corresponding resource so that each identify LED, when lit or blinking, provides a visual indicator of the corresponding resource's physical location to facilitate finding the resource. In the depicted embodiment, each processor 102 has a corresponding identify indicator 123, each I/O bridge 110 has a corresponding identify indicator 130, and each I/O adapter 122, 124 has a corresponding identify indicator 142, 144 respectively.

The identify indicators may be attached to the bus, port, or socket into which an adapter is inserted or attached directly to an adapter or resource enclosure. In cases where an identify indicator is connected to a bus, each such indicator may have its own bus address or other means enabling a bus master such as the bus bridge to manipulate it.

In the depicted embodiment, it can be seen that system 100 includes resources and their corresponding identify indicators that are allocated to an individual LPAR 101. IOB 120a and IOA 122a, for example, are resources, each having their own identify indicators, that are allocated to partition 101a. In a likely partitioning configuration, a user or administrator of partition 101b does not have the ability to manage the identify indicators allocated to partition 101a. If an identify indicator on partition 101a is inadvertently left in a blinking or lit state, it diminishes the value of the remaining identify indicators by providing a misleading visual indicator. Thus, if a stale identify indicator is blinking while an FRU or resource with a currently pending management issue has its corresponding identify indicator blinking, the system administrator must guess which of the two blinking indicators corresponds to the FRU of interest.

Figure 5:
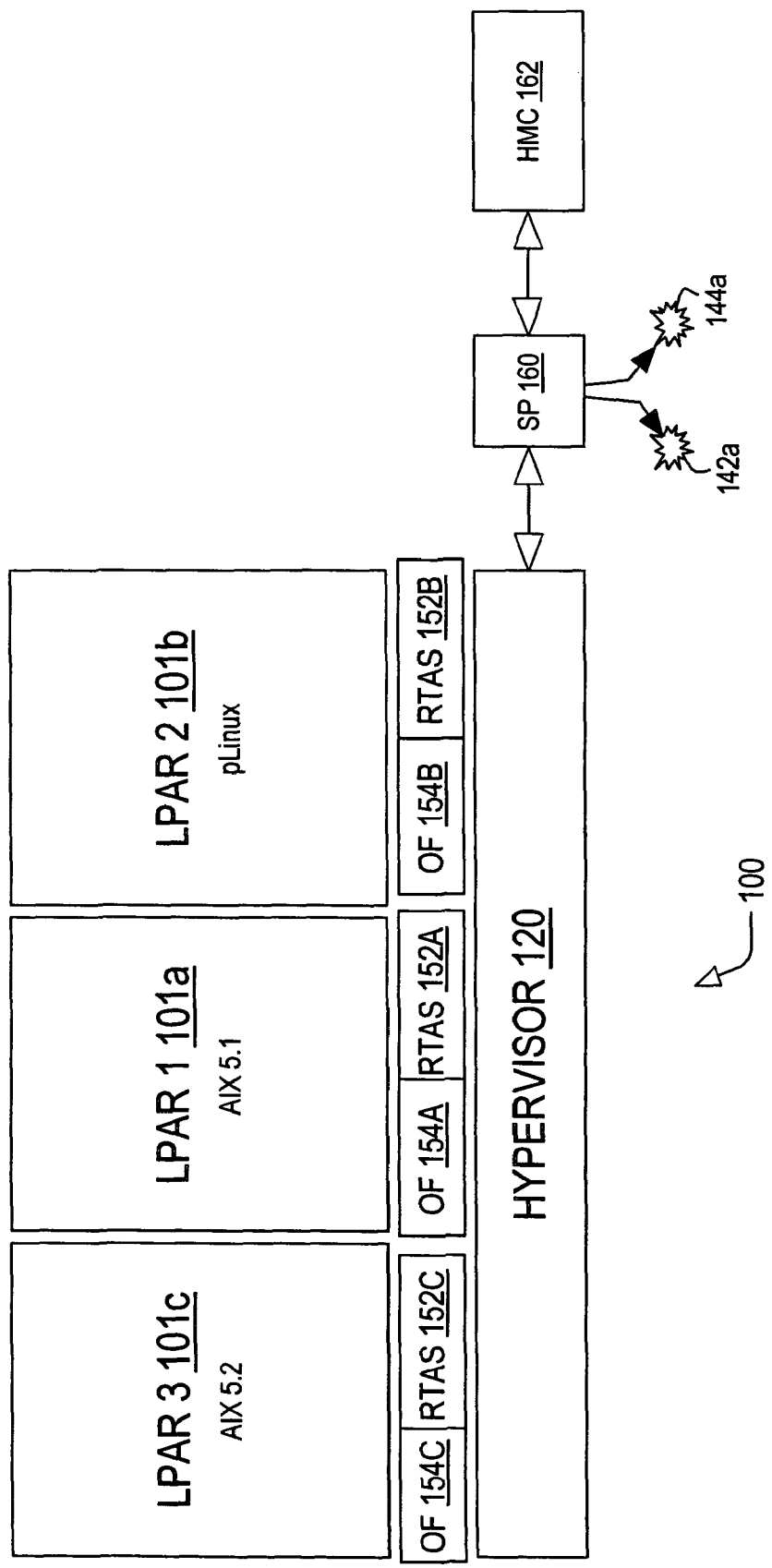
FIG. 5 is a conceptual representation of selected software and firmware elements of the system of FIG. 1 according to one embodiment of the invention.

Referring now to FIG. 5, selected software and firmware elements of data processing system 100 according to one embodiment of the invention are shown to illustrate means by which access to various resources including system identify indicators is granted. The depicted embodiment of system 100 is exemplified by the pSeries 690, logically-partitionable server system from IBM Corporation. In the depicted embodiment, system 100 is partitioned into three LPAR's 101a, 101b, and 101c. Each LPAR 101 is shown as installed with a different operating system (AIX 5.1, AIX 5.2, and pLinux in the depicted example). Control of system resources is granted through the layer of firmware identified as hypervisor 120. Hypervisor 120 controls the physical memory locations that can be accessed from within any partition. With respect to the present invention, hypervisor 120 controls access to a list of locations associated with identify indicators and is responsible for setting identify indicators to a blinking state and resetting the indicators to a normal state.

A hardware management console (HMC) 162 is shown as connected to hypervisor 120 through an intervening service processor (SP) 160. HMC 162 is a dedicated PC-type system providing a graphical user interface (GUI) and applications for configuring and managing system 100. SP 160 provides the interface between system 100 and HMC 162. SP 160 effects changes in hardware configuration when HMC 162 creates or modifies partitions. Hypervisor 120 and HMC 162 access the identify indicators (e.g., 142a, 144a) through SP 160, which has direct control of the indicators.

Also shown in FIG. 5, are open firmware layers 154A, 154B, 154C and runtime abstraction service (RTAS) layers 152A, 152B, and 152C between hypervisor 120 and the corresponding operating systems 110a, 101b, and 101c. Each instance of open firmware 154 has access to all devices that are part of the corresponding partition. Each instance of RTAS 152 enables service calls from the corresponding platform or operating system into hypervisor 120. Using RTAS 152 and/or open firmware 154, the operating system 101 of an LPAR 101 is permitted to initiate certain controlled hypervisor functions. Using these components, an operating system or application program (not depicted) executing in LPAR 2 101b may turn on an identify indicator by making a call to request hypervisor 120 to set the indicator to the identify (blink) state.

The depicted elements of system 100 are employed in the present invention to effect user tunable conditions for resetting identify indicators on the system. These tunable conditions may be implemented at differing levels of "locality" depending upon the implementation. At a global level, HMC 162 may be used to specify conditions under which identify indicators are reset globally, i.e., irrespective of partition boundaries. At a partition level, each operating system 101, through its corresponding firmware and RTAS layers, can control conditions under identify indicators allocated to the partition in which the operating system is executing are reset. Because the globally tunable parameters apply without regard to the operating system and/or application program, they are most applicable to or suitable for conditions that are highly generic. Operating system controlled parameters, on the other hand, while specific to each partition, may provide more sophisticated control over a particular identifier.

Illustrating the distinction between globally tunable parameters and partition tunable parameters, a globally tunable condition is exemplified by, for example, detecting the completion of a hot swap procedure or detecting the expiration of a specified or default timeout period. In either of these cases, detecting the appropriate condition is achievable at the hypervisor level without regard to the operating system or application program. Completion of a hot swap, for example, may be detected by monitoring the appropriate adapter card for a change in vital product data or serial number. Since most adapter cards have electrically detectable serial numbers and other information stored in non-volatile memory, hypervisor 120 can determine when a hot swap is completed by polling the appropriate adapter card until a change in serial number is detected. This procedure is generic across partitions, operating systems, and applications programs and is, therefore, suitable for control at a global level. In other cases, monitoring for the completion of other tasks or events would be dependent on the partition's software. If, for example, a system administrator wished to monitor for completion of a wrap plug test, the operating system or application program implementing the wrap test would be the most suitable candidate for determining completion of the event.

Figure 2:
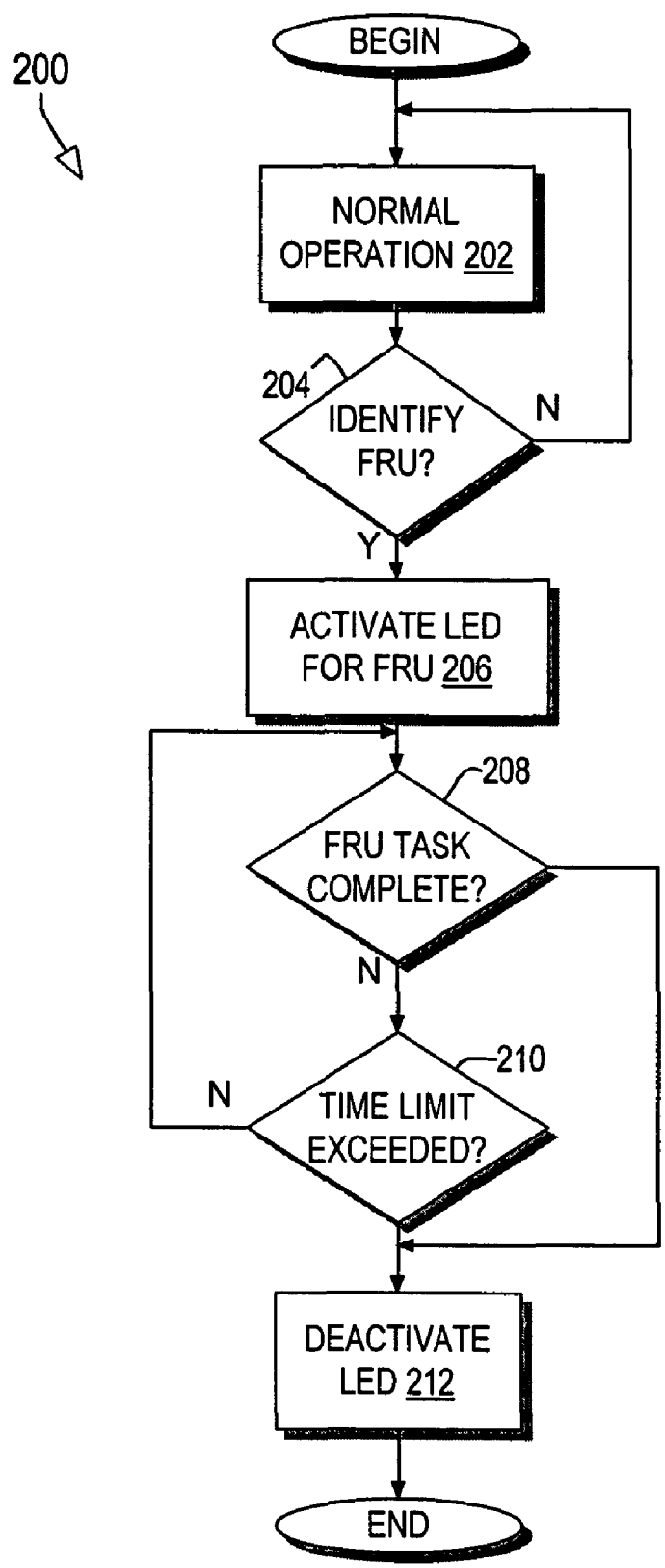
FIG. 2 is a flow diagram illustrating a general method for controlling identify indicators in the data processing system of FIG. 1 according to an embodiment of the present invention.

Referring now to FIG. 2, a flow diagram illustrating a method 200 of managing user tunable identify indicators in a data processing system such as system 100 is presented. As indicated previously, substantial portions of method 200 may be implemented as computer software stored on system 100. Method 200 begins in an initial state of normal operation (block 202). For purpose of this invention, normal operation is exemplified by a state of existence in which a partition's operating system is booted and functioning and in which the partition's identify indicators are in their default and "normal" state of off.

For purposes of this invention, a system or system partition remains in normal operating state 202 until an event requires the identification of an FRU (block 204). The event that requires the identification of an FRU may be initiated by a user request or a machine generated interrupt, fault, or other indication of some form of failure. In either case, identifying the appropriate FRU may be achieved by issuing an IDENTIFY command from the operating system's command line or from a configuration utility running under the operating system.

In response to the request to identify an FRU in block 204, an identify indicator associated with the FRU is activated (block 206). The activation of an indicator is preferably carried out by system management software, perhaps in conjunction with a user interface or other utility. A software utility may, for example, provide a user with an interface enabling the user to select a resource for identification. Following selection of a resource by the user with a mouse click or other event, the operating system assumes responsibility for locating the FRU of interest within the system and activating its corresponding identify indicator.

While conventional identify indicator implementations are complete at this point, the present invention includes additional functionality that prevents or reduces the occurrences of identify indicators being left on after the event triggering the identifying indicator has been completed. Thus, method 200 as depicted in FIG. 2, includes polling or other form of monitoring in block 208 to determine whether the task for which the identify indicator was lit has been completed. If the task has been completed, the identify indicator is deactivated (block 212). If the task is not complete, the depicted embodiment of method 200 includes a default timeout condition that is checked in block 210. If the timeout limit has been exceed, the identify indicator is deactivated. If the task is not complete and the timeout limit has not been exceeded, the identify indicator is left in an activated state.

By monitoring for completion of the appropriate task, the present invention beneficially maintains the correct state for all of the identify indicators. In the case of a global condition, this automated identify indicator state control occurs as part of a hypervisor or other system management routine that spans the partitions in a multi-partitioned system. State control of identify indicators is not, therefore, dependent upon the systems administration or maintenance of any individual partition. In this manner, the clearing or resetting of identify indicators is guaranteed regardless of the procedures followed by the system administrator of any individual partition.

The present invention ultimately employs three levels of protection against negligently failing to reset an identify indicator. The first level of protection is the system administrator. The system administrator who requested the action can turn off the indicator when it is no longer needed. This is the least dependable of the protection levels and is the exact problem to which the alternative protection mechanisms of the present invention are directed.

The next level of protection is "local" protection implemented at the operating system level. At this level, the library calls within an operating system that request the indicator to turn on can also monitor for whatever criteria was established to indicate completion. This is considerably more reliable than manual resetting in that it removes the element of human error. Local protection, moreover, may represent the best or only available level of protection when the condition being monitored is operating system specific. Local protection does not, however, extend across partition boundaries. If the local protection on one partition is not implemented correctly thereby resulting in one or more stale identify indicators, the users of the remaining partitions do not have access to the indicator.

The most robust level of protection is when identify indicator criteria monitoring is done globally in hypervisor 120 because hypervisor 120 represents the most trusted level of code and spans partition boundaries. Wherever possible this is where the monitoring represented by reference numerals 208 (and 210) should be done.

In the case of an I/O adapter hot swap, for example, hypervisor 120 may control the appropriate identify indicator as follows. When an RTAS call is made to set an identify indicator, the calling operating system passes a token indicating what type of identify indicator is being set. The same physical identify indicator can be specified with different tokens. One token merely specifies the indicator at the specified location to blink. Another token, refers to the same indicator but specifies a "Dynamic Reconfiguration (DR)" indicator that will be used for the purpose of hot swap. In this case of a hot swap, hypervisor 120, pursuant to a global reset condition, may then monitor that slot for changes in vital product data (VPD). Hypervisor 120 may then turn off the indicator when a new serial number is found (or when the time limit is exceeded) thereby guaranteeing that the indicator is reset at the earliest opportunity.

Figure 3:
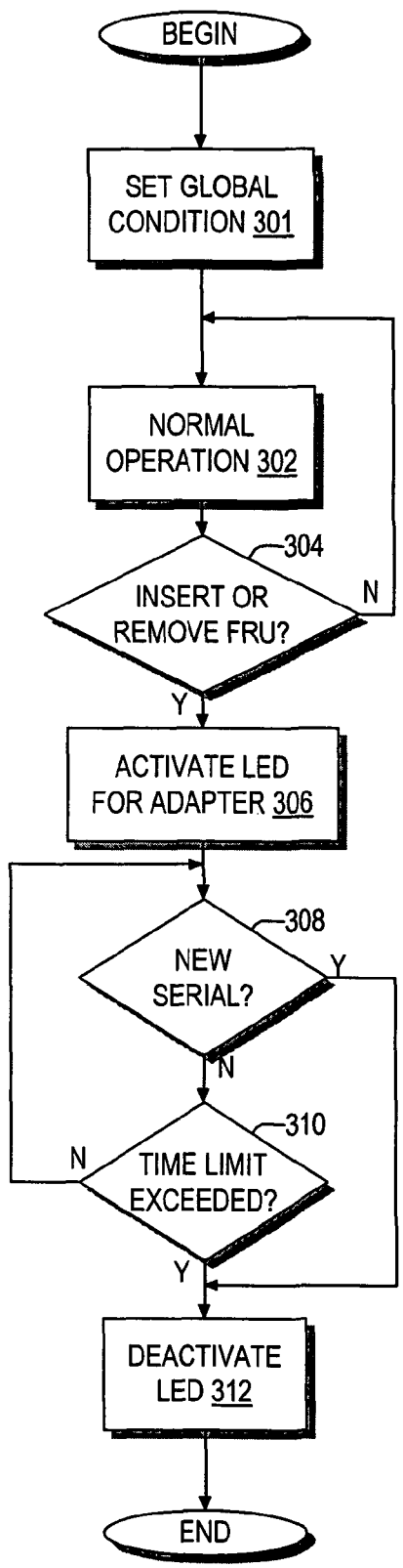
FIG. 3 and FIG. 4 are flow diagrams illustrating examples of identify indicator control according to the method of FIG. 2.
Figure 4:
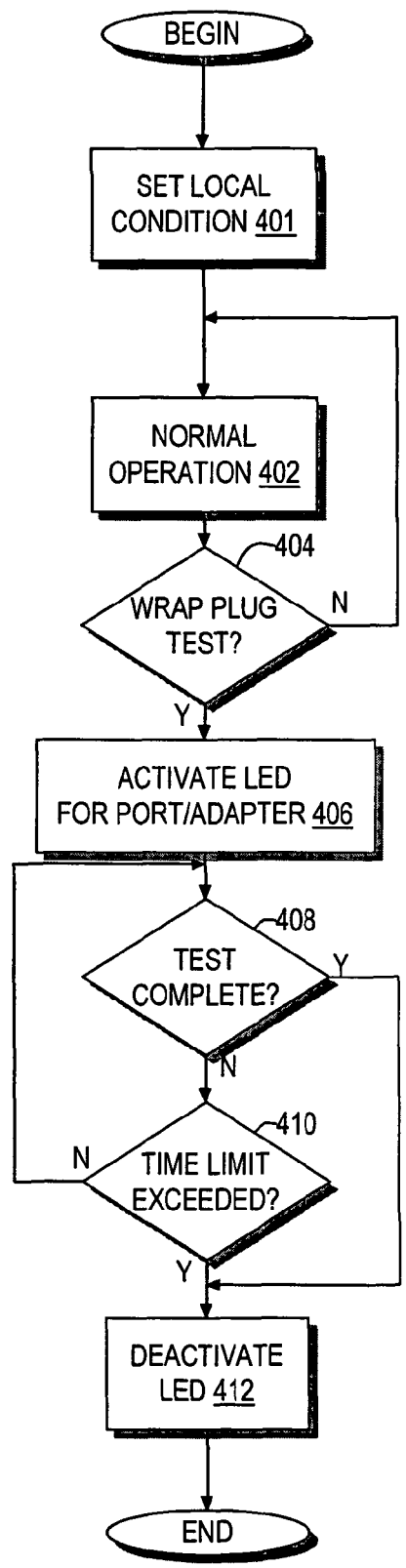

Referring now to FIG. 3 and FIG. 4 flow diagrams illustrating global and local examples of the functionality represented by method 200 are presented. In FIG. 3, for example, the completion of a hot swap is set (block 301) as a global condition applying across partition boundaries. The system then remains in the normal operational state represented by reference numeral 302 until a hot swap is initiated. Upon initiating (block 304) a hot swap, the appropriate LED, or other identify indicator, is activated (block 306). In the depicted implementation, the system 100 determines when a replacement adapter or other device has been activated by polling the adapter for vital product data (VPD) including the serial number of the corresponding unit. When a new serial number is detected (block 308), the LED is deactivated (block 312). Otherwise, the LED remains activated until a time out occurs in block 310 or the looping mechanism detects a new serial number. In other embodiments, the detection of a new adapter card may be achieved by monitoring the corresponding connector for an open circuit or in any other manner suitable for determining the insertion of an adapter card in its connector.

In FIG. 4, a local (partition dependent) condition is set (block 401). In the depicted example, the local condition is the completion of a wrap plug test. Normal operation (block 402) then resumes until the system detects a request for a wrap plug test in block 404. The wrap plug test request may be initiated by a user of the system or automatically generated by the operating system of the partition to which the port or connector belongs. Once a wrap test plug request is detected, an LED in the vicinity of the appropriate connector is activated (block 406) and monitored until either completion of the wrap test is determined in block 408 or a time out occurs in block 410. In this manner, the identify indicator is deactivated (block 412) at the completion of the wrap plug test or shortly thereafter.

The flow diagrams of FIG. 3 and FIG. 4 are but two examples of the types of events for which the system is configured to control automatic deactivation of the identify indicators. It will be apparent to those skilled in the art having the benefit of this disclosure that the present invention generally contemplates a data processing system employing automated deactivation of identify indicators both within and across logical partition boundaries. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:
1. A data processing system, comprising:
a plurality of field replaceable units (FRUs) each comprising a separate resource from among a plurality of resources comprising at least one processor, at least one system memory, at least one bus, and at least one adapter;
a plurality of logical partitions each virtually allocated a separate selection of the plurality of field replaceable units, each of the plurality of logical partitions running a separate instance of at least one operating system;
a plurality of identify indicators wherein a separate identify indicator from among said plurality of identify indicators is associated with each of the plurality of field replaceable units;
each of the plurality of separate instances of the at least one operating system among the plurality of logical partitions for controlling conditions under which each of the plurality of identify indicators allocated to the particular logical partition from among the plurality of logical partitions is turned off;
at least one global level controller separate from the plurality of logical partitions for enabling a user to specify a condition under which an activated identify indicator from among the plurality of identify indicators is reset independent of which of the plurality of logical partitions the activated identify indicator is allocated to;

the at least one global level controller for globally monitoring the plurality of resources of the system independent of allocations to the plurality of logical partitions to detect satisfaction of the condition and for deactivating the activated identify indicator in response thereto.

2. The system of claim 1, wherein the specified condition comprises completion of an FRU replacement procedure.

3. The system of claim 2, wherein the at least one global level controller for globally monitoring the plurality of resources of the system comprise means for polling the serial number of the FRU associated with the activated identity indicator to determine when the FRU has been replaced.

4. The system of claim 1, wherein the at least one global level controller comprises a hardware management console and a hypervisor.

5. The system of claim 1, further comprising the at least one global level controller for monitoring the duration that each activated identify indicator remains in an activated state and for deactivating any identify indicator that has been in the activated state in excess of a duration exceeding a threshold duration.

6. The system of claim 1, further comprising means for specifying a local condition via one of the plurality of operating system instances, wherein the local condition applies to only the particular selection of the plurality of resources on the partition in which the one operating system instance is installed.

7. A computer program product for controlling identify indicators on a data processing system, the computer program product comprising computer executable instructions stored on a computer readable medium, comprising:

computer code means for virtually allocating a separate selection of a plurality of field replaceable units to a plurality of logical partitions, where each of the plurality of logical partitions runs a separate instance of at least one operating system, wherein the plurality of field replaceable units each comprise a separate resource from among a plurality of resources comprising at least one processor, at least one system memory, at least one bus, and at least one adapter, wherein each of said plurality of field replaceable units is assigned a separate identify indicator from among a plurality of identify indicators;

computer code means for enabling each of the plurality of separate instances of the at least one operating system among the plurality of logical partitions to control conditions under which each of the plurality of identify indicators allocated to the particular logical partition from among the plurality of logical partitions is turned off;

computer code means for enabling a user to specify a condition for resetting an activated identify indicator from among said plurality of identify indicators independent of which of the plurality of logical partitions the activated identify indicator is allocated to;

computer code means for globally monitoring the plurality of resources of the system independent of allocations to the plurality of logical partitions to determine satisfaction of the condition;

and computer code means for deactivating the activated identify indicator in response to detecting satisfaction of the condition.

8. The computer program product of claim 7, wherein the condition comprises completion of an adapter hot swap procedure.

9. The computer program product of claim 8, wherein means for globally monitoring plurality of resources of the system are further characterized as means for polling information including the serial number of the adapter to determine when the adapter has been replaced.

10. The computer program product of claim 7, further comprising computer code means for a console for enabling a user to specify a condition for resetting an activated identify indicator from among said plurality of identify indicators independent of which of the plurality of logical partitions the activated identify indicator is allocated to and for a hypervisor for globally monitoring the plurality of resources of the system independent of allocations to the plurality of logical partitions to determine satisfaction of the condition and deactivating the activated identify indicator in response to detecting satisfaction of the condition.

11. The computer program product of claim 10, further comprising computer code means for globally monitoring the duration that each activated identify indicator from among said plurality of identify indicators remains in an activated state and for deactivating any identify indicator from among said plurality of identify indicators that has been in the activated state in excess of a duration exceeding a threshold duration.

12. The computer program product of claim 10, further comprising computer code means for enabling the user to specify a local condition for one of the plurality of operating system instances to reset an activated identify indicator, wherein the local condition applies only to a particular selection of identify indicators from among said plurality of identify indicators allocated to a corresponding partition.

* * * * *